US011012538B2

(12) United States Patent
Edgar et al.

(10) Patent No.: US 11,012,538 B2
(45) Date of Patent: May 18, 2021

(54) SERIAL COMMUNICATION TAPPING AND TRANSMISSION TO ROUTABLE NETWORKS

(71) Applicant: Battelle Memorial Institute, Richland, WA (US)

(72) Inventors: Thomas W. Edgar, Richland, WA (US); Sean J. Zabriskie, Burbank, WA (US); Eric Y. Choi, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 636 days.

(21) Appl. No.: 14/038,069

(22) Filed: Sep. 26, 2013

(65) Prior Publication Data

US 2014/0036911 A1 Feb. 6, 2014

Related U.S. Application Data

(63) Continuation-in-part of application No. 12/884,455, filed on Sep. 17, 2010, now abandoned.

(51) Int. Cl.
*H04L 29/06* (2006.01)

(52) U.S. Cl.
CPC ............ *H04L 69/03* (2013.01); *H04L 63/20* (2013.01); *H04L 63/30* (2013.01); *H04L 69/08* (2013.01)

(58) Field of Classification Search
CPC ......... H04L 69/03; H04L 63/20; H04L 69/08; H04L 63/30
USPC ....................................................... 370/389
See application file for complete search history.

(56) References Cited

U.S. PATENT DOCUMENTS

| 5,237,408 | A | 8/1993 | Blum et al. |
| 7,356,076 | B2 | 4/2008 | Xiao et al. |
| 7,496,104 | B2 | 2/2009 | Moussa et al. |
| 7,611,383 | B1 | 11/2009 | Huang |
| 7,778,207 | B2 | 8/2010 | Light et al. |
| 7,787,400 | B2 | 8/2010 | Light et al. |
| 7,860,033 | B2 | 12/2010 | Light et al. |
| 7,860,034 | B2 | 12/2010 | Light et al. |
| 8,064,478 | B2 | 11/2011 | Morrow |
| 8,396,947 | B2 * | 3/2013 | Pao ..................... H04L 43/0817 340/870.07 |
| 8,976,015 | B2 * | 3/2015 | Rieth et al. ................... 340/438 |
| 2002/0131446 | A1 | 9/2002 | Metcalf |
| 2004/0139210 | A1 | 7/2004 | Lee et al. |

(Continued)

OTHER PUBLICATIONS

Steve Corrigan, 'Introduction to the Controller Area Network (CAN)', Texas Instruments, Jul. 2008, pp. 1-15.*

(Continued)

*Primary Examiner* — Melvin C Marcelo
(74) *Attorney, Agent, or Firm* — Wells St. John P.S.

(57) ABSTRACT

Apparatuses and methods for tapping serial communications and transforming the serial data into a format appropriate for routable networks are significant for purposes of security and troubleshooting, especially in critical infrastructure networks. Communication taps should be completely passive such that any failure would not interrupt the serial communications. Furthermore, automatic determination of unspecified serial protocol frames allow general implementation across various networks, or across devices within a single network, without the need to customize for each implementation.

38 Claims, 10 Drawing Sheets

(56) References Cited

U.S. PATENT DOCUMENTS

| | | | |
|---|---|---|---|
| 2005/0001179 | A1 | 1/2005 | Gisler et al. |
| 2006/0031577 | A1 | 2/2006 | Peluso et al. |
| 2006/0061100 | A1 | 3/2006 | Choi et al. |
| 2006/0062229 | A1 | 3/2006 | Choi et al. |
| 2006/0083511 | A1 | 4/2006 | Edmunds et al. |
| 2007/0171966 | A1 | 7/2007 | Light et al. |
| 2007/0189323 | A1* | 8/2007 | Swoboda et al. ............. 370/451 |
| 2007/0253349 | A1 | 11/2007 | Light et al. |
| 2008/0013467 | A1 | 1/2008 | Light et al. |
| 2008/0014879 | A1 | 1/2008 | Light et al. |
| 2010/0231397 | A1 | 9/2010 | Ke |
| 2010/0275031 | A1* | 10/2010 | Ferry ................... H04L 63/029 713/181 |
| 2011/0124209 | A1 | 5/2011 | Wu |
| 2011/0153886 | A1 | 6/2011 | Wei et al. |
| 2012/0069846 | A1 | 3/2012 | Edgar et al. |
| 2012/0250784 | A1 | 10/2012 | Austerman et al. |

OTHER PUBLICATIONS

Bluetooth Specification Version 4.0 [vol. 1], Jun. 30, 2010, pp. 39-48.*
Benito et al., 'Performance Evaluation of Four FieldBuses', IEEE, 1999, pp. 881-890.*
Tyco Electronics Energy Division, 'RS485 & Modbus Protocol Guide', dated Jul. 2002 Rev 6, pp. 1-35.*
DNP Users Group, 'dnp A DNP3 Protocol Primer', Revision A, Mar. 20, 2005, pp. 1-8.*
Zhang Yan et al., 'A General Module for the Detecting and Decoding of Serial Buses', 2010 International Conference on Intelligent Computation Technology and Automation. May 11-12, 2010, pp. 108-110.*
WO PCT/US2011/046114 IPRP, Mar. 19, 2013, Battelle Memorial Institute.
WO PCT/US2011/046114 Search Rept., Apr. 27, 2012, Battelle Memorial Institute.
WO PCT/US2011/046114 Writ. Opin., Apr. 27, 2012, Battelle Memorial Institute.
Applied Systems Engineering, Inc. "BCOM-USB for the ASE2000", Brochure, online at www.ase-systems.com.
Institute for Information Infrastructure Protection, "Security Services Suite (SecSS)", online at http://www.thei3p.org/projects/pcs07overview.html.
Lantronix, "Serial Device Servers", Brochure.
Lantronix, "Xport AR Embedded Processor Module", online at www.lantronix.com.
Moxa, "Transio TCC-82", MOXA Technologies Co., Ltd., 2006, 2 pages.
NetDecoder, "Industrial Communication Analyzer", online at www.fte.com.
NetOptics, "10/100BaseT Tap", Brochure, onlice at www.netoptics.com.
Serialtest, "RS-232/422/485 Serial Analyzer", Brochure.
Tofino Argon Security Appliance, "DS-TSA-Argon", Data Sheet Version 4.0, online at www.tofinosecurity.com.
Atmel, "Atmel Software Framework: Quick Start Guide for the SAM USART Module", Available online at http://asf.atmel.com/docs/latest/sam.drivers.usart.usart_synchronous_example.sam3u_ek/html/sam_usart_quickstart.html, May 6, 2016, 2 pages.
Atmel, "AVR1307: Using the XMEGA USART", Available online at http://www.atmel.com/images/doc8049.pdf, Feb. 2008, 7 pages.
Durda, "Serial are UART Tutorial", Available online at https://www.freebsd.org/doc/en/articles/serial-uart/, May 29, 2003, 12 pages.
IEEE Standards Association, "1815-2012—IEEE Approved Draft Standards for Electric Power Systems Communications—Distributed Network Protocol (DNP3)", Available online at http://standards.ieee.org/findstds/standard/1815-2012.html, Aug. 19, 2012, 1 page.
Modbus Organization, Inc., "MODBUS over Serial Line Specification and Implementation Guide V1.02", Available online at http://www.modbus.org/docs/Modbus_over_serial_line_V1_02.pdf, Dec. 20, 2006, 44 pages.
National Instruments, "Serial Communication General Concepts", Available online at http://www.ni.com/white-paper/11390/en/, Jul. 11, 2012, 3 pages.
Sparkfun, "Serial Communication", Available online at https://learn.sparkfun.com/tutorials/serial-communication/rules-of-serial, Sep. 7, 2015, 3 pages.
TechTarget, "USART (Universal Synchronous/Asynchronous Receiver/Transmitter)", Available online at http://whatis.techtarget.com/definition/USART-Universal-Synchronous-Asynchronous-Receiver-Transmitter, Jul. 26, 2012, 12 pages.
Wikipedia, "Universal Asynchronous Receiver/Transmitter", Available online at https://en.wikipedia.org/wiki/Universal_asynchronous_receiver/transmitter, Dec. 8, 2007, 4 pages.

* cited by examiner

SERIAL COMMUNICATION TAPPING AND TRANSMISSION TO ROUTABLE NETWORKS

CROSS-REFERENCE TO RELATED APPLICATIONS

This invention claims priority from and is a continuation in part of currently pending U.S. patent application No. 12/884,455, filed Sep. 17, 2010, which is incorporated herein by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Critical infrastructure networks still utilize serial communications because of the presence and reliance on legacy systems and because of the slow speed at which the industries upgrade their technology. Because of the electrical, environmental, and operational requirements, traditional IT security and troubleshooting solutions are often unsuitable in these critical systems. For example, many of the legacy devices in critical infrastructure networks cannot support the relatively high computational burden of traditional security and troubleshooting solutions. Furthermore, the security and troubleshooting system cannot introduce any new points of failure in the network. In order to secure these critical infrastructure networks, there is a need for systems and methods of sending serial traffic onto a routable network, where it could be centrally monitored, without adding computational overhead or new points of failure to critical infrastructure networks.

SUMMARY

The present invention includes apparatuses and methods for tapping serial communications between two or more devices and transforming the serial data into a format appropriate for routable networks. The serial communications tapping can enable monitoring of devices that can include, but are not limited to, sensors, switches, valves, relays, workstations, servers, and control computers. The serial communications tap is completely passive such that any failure of the tap apparatus would not interrupt the serial communications. Furthermore, embodiments of the present invention adapt automatically and operate without foreknowledge of the serial protocol frames (i.e., the serial protocol frames are unspecified. Therefore, the embodiments can be easily implemented across various networks without the need to customize for each implementation.

The embodiments can, for example, facilitate the secure convergence of process control networks with information technology networks through low-cost embedded devices that passively tap serial line communications, perform packetization processes, and wrap them in a routable protocol for transmittal over an Ethernet network. The embedded devices can be placed in-line on legacy links between process control devices. They collect data sent between the process control devices and process the data in order to transmit via another network.

In one embodiment, apparatuses for passively tapping serial communications comprise passive, serial-communications, interception circuitry that includes at least two serial communications pass-throughs and a processor. Each serial communications pass-through is connected to the processor and is interfaced to a serial communication cable through which the serial communications are transmitted. The serial communications supports bi-directional communication between the two or more devices, in which case one pass-through taps each direction of communication.

Embodiments described herein can preferably be applied to situations in which the protocol of the serial communications are not pre-specified. The processor executes programming to determine the serial protocol frames according to characteristics of the serial communications. The processer then executes programming to wrap the serial protocol frames in a routable protocol, thereby forming a routable packet, and to transmit the routable packets to one or more routable addresses through an interface connecting the processor to a routable network. Preferably, the routable network is based on internet protocol (IP) and the one or more routable addresses are IP addresses.

Examples of serial communications having serial protocol frames that are unspecified to the apparatus can include, but are not limited to those based on a process control serial protocol. Examples include, but are not limited to, distributed network protocol 3 (DNP3) and Modbus. RS 232/485 is common for the legacy communication in which embodiments described herein can be implemented.

Each pass-through can comprise a serial port directly connected to the serial communication cable. At least two pass-throughs are required to tap bi-directional communication between two devices. The interception circuitry must have an impedance greater than that of the serial communication cable. The pass-through can alternatively comprise an inductive coupling. Further still, the pass-through can comprise a capacitive coupling to intercept the serial communications by means of capacitance.

In some embodiments, the characteristics of serial communications include timing-based signals. In such instances, the processing device can execute further programming to associate timing gaps between the timing-based signals with frame edges that define the serial protocol frames.

In other embodiments, the characteristics of serial communications include frame synchronization delimiters and length fields and the processing device executes further programming to define the beginning and the length of serial protocol frames according to the frame synchronization delimiters and length fields, respectively. For example, optional offsets can be utilized. The offsets can be variable in length because some protocols utilize a header and then a length field. The offsets can address such instances and others that are similar.

In still other embodiments, the characteristics of serial communications include frame synchronization delimiters and frame end delimiters and the processing device executes further programming to define the beginning and the end of serial protocol frames according to the frame synchronization delimiters and frame end delimiters, respectively.

The characteristics of serial communications can alternatively include time variance between signals and the processing device executes further programming to identify a baseline time gap in the signals and to define statistically significant deviations from the baseline time gap as the beginnings and the ends of serial protocol frames.

Alternatively, the characteristics of serial communications can include byte frequency and the processing device executes further programming to identify statistically significant occurrences of byte frequency patterns and to define the statistically significant occurrences with the beginnings and the ends of serial protocol frames.

Still other characteristics of serial communications can include byte frequency as well as time variance between signals and the processing device executes further programming to identify statistically significant occurrences of byte frequency patterns, to identify a baseline time gap in the signals, and to define statistically significant deviations from the baseline time gap combined with statistically significant occurrences of byte patterns as the beginnings and the ends of the serial protocol frames.

In preferred embodiments, the programming executed by the processing device is stored in storage circuitry. The pass-throughs, the processor, the storage circuitry, and the interface are assembled as an embedded system. As used herein, an embedded system refers to a device that runs firmware, provides a few dedicated functions, and has real-time computing constraints. It is dedicated to a particular task. By contrast, a general-purpose computer is designed to be flexible and to meet a wide range of end user needs.

Another embodiment of the present invention includes methods to passively tap bi-directional serial communications, which have serial protocol frames that are unspecified, transmitted through a serial communication cable between two or more devices. The method, which is executed by a processor, includes passively intercepting the bi-directional serial communications through at least two serial communications pass-throughs connected to the processor and to the serial communication cable and determining serial protocol frames according to characteristics of the serial communications. Routable packets can then be formed by wrapping the serial protocol frames in a routable protocol and transmitting the routable packets to one or more routable addresses through an interface connecting the processor to a routable network.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
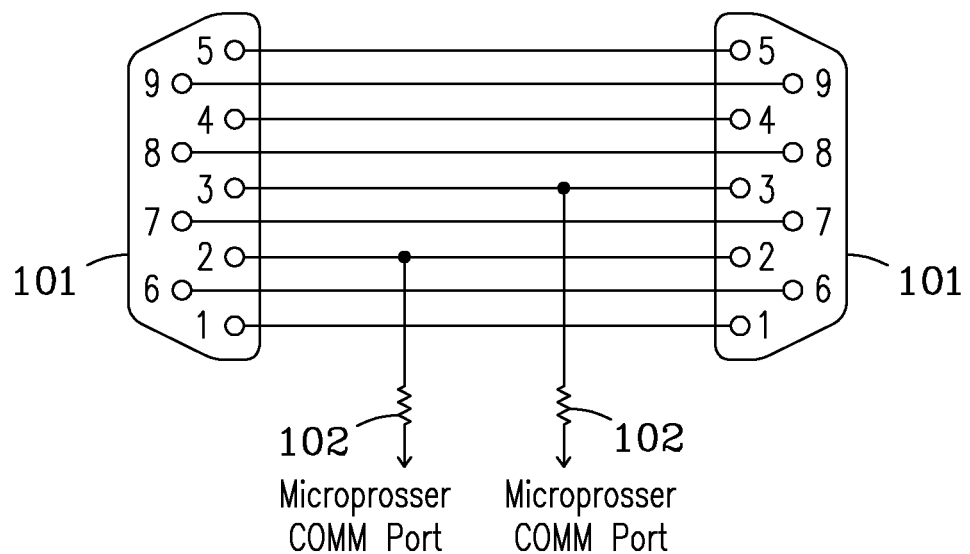
FIG. 1 is a diagram depicting one embodiment of the present invention in which the pass-through includes a pair of serial ports.

FIGS. 1-13 show a variety of embodiments and aspects of the present invention. Referring first to FIG. 1 a diagram depicts the pass-throughs interfacing the serial communication cable and the interception circuitry passing the serial data to a microprocessor. In this embodiment, each pass-through taps a line between serial ports 101 directly connected to the serial communication cable. Accordingly, the apparatus is connected in line with the serial communication cable. In such instances, the interception circuitry must have an impedance greater than that of the serial communication cable. The impedance in the interception circuitry can be increased using resistors 102 and/or including components having relatively large impedances. The large impedance in the interception circuitry ensures that the serial communications will still transmit through the serial communications cable in the event that the apparatus fails. In preferred embodiments, the impedance of the interception circuitry is at least 10% higher than that of the serial communication cable.

Figure 2:
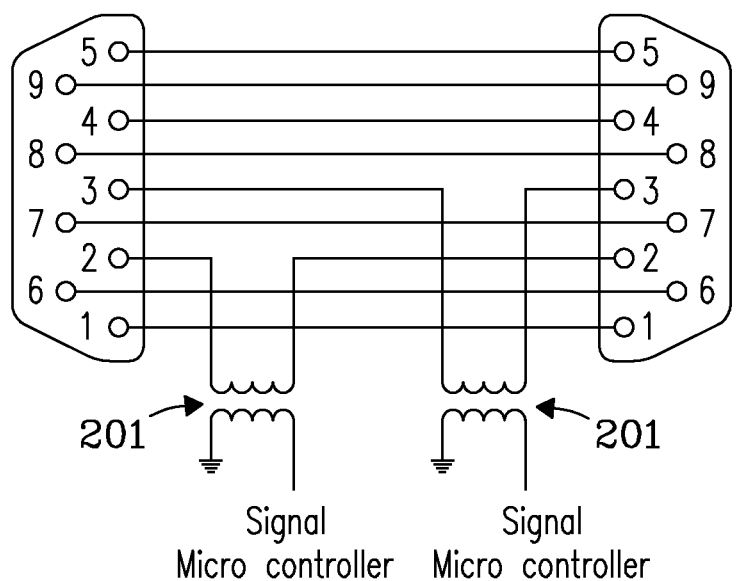
FIG. 2 is a diagram depicting one embodiment of the present invention in which the pass-through includes an inductive coupling.

Referring to FIG. 2, the diagram depicts each pass-through as an inductive coupling. The inductive coupling can capture the leading and trailing edges of a bit, which are then amplified by components in the interception circuitry, by electromagnetic induction which is the induction of a voltage in one wire based on the change in current flow of through a primary wire. In a particular embodiment, the inductive coupling utilizes a transformer 201. A coil of wire of the serial signal can be wound on the primary side of the transformer while a passive capture signal can be wound around the secondary side of the transformer. The coupling can be increased by a transformer so the magnetic field of the primary coil will pass through to the secondary coil such that a change in current flow through one coil will induce a voltage in the other.

Figure 3:
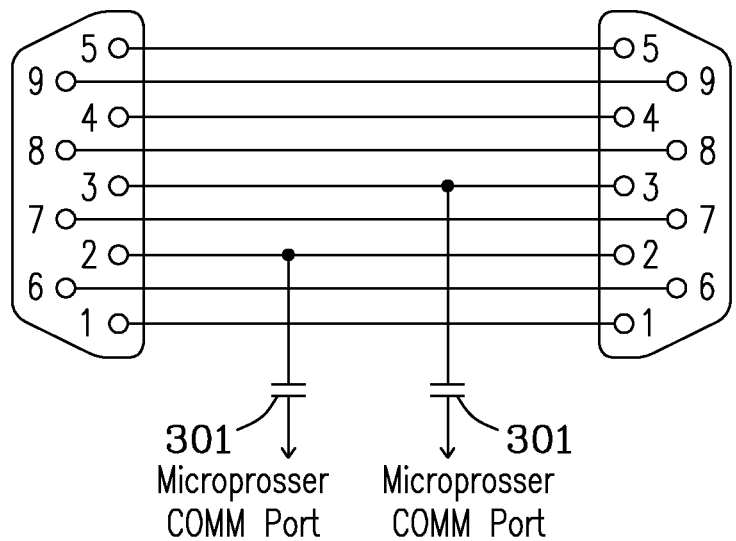
FIG. 3 is a diagram depicting one embodiment of the present invention in which the pass-through includes a capacitive coupling.

Referring to FIG. 3, the diagram depicts the pass through as a capacitive coupling. The capacitive coupling can comprise a capacitor 301 in series between the serial communications cable and the interception circuitry. The capacitive coupling can remove the DC bias from an AC signal. In some embodiments, a DC bias can be reintroduced in the interception circuitry to recreate the original serial communication.

Figure 4:
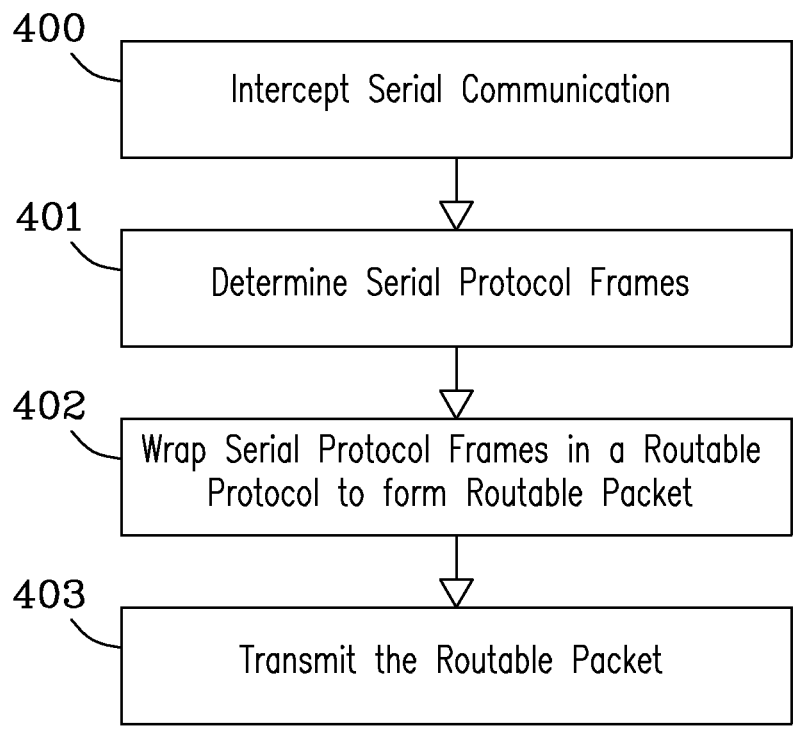
FIG. 4 is a block diagram depicting methods according to embodiments of the present invention.

The serial data intercepted by the pass through is provided to a processor. FIG. 4 is a block diagram depicting the steps that can be executed by a processor to tap one or more serial communications and transmit the communications to a centralized location for purposes of security and troubleshooting. Serial communications that have been passively intercepted 400 by a serial communications pass-through connected to the processor can have a serial protocol frame that is unspecified. Accordingly, the processor first determines 401 the serial protocol frames according to characteristics of the serial communications. Once the serial protocol frames are known, routable packets are formed 402 by wrapping the serial protocol frames in a routable protocol. The processor can then transmit 403 the routable packets to one or more routable addresses through an interface connecting the processor to a routable network.

Figure 5:
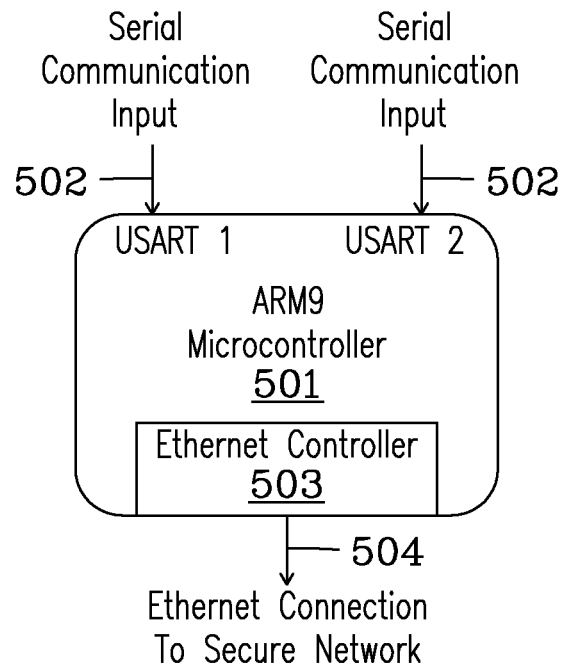
FIG. 5 is a diagram depicting a microcontroller for processing serial communications intercepted according to one embodiment of the present invention.

The processor can be a microcontroller having at least two universal synchronous and/or asynchronous receiver/transmitter (USART) ports, at least some memory to store processor-executable instructions, and at least one port for network communication, such as an Ethernet port. Referring to FIG. 5, one embodiment of a microcontroller includes an ARM9 microcontroller 501. Serial communication data intercepted from the serial communication cable is provided through USART 1 and USART 2 ports 502. Since embodiments described herein can tap bi-directional communication, two signals are intercepted and sent to the microcontroller processor. The ARM9 microcontroller processor receives the serial communications, which are of an unknown protocol, wraps the data to form a UDP packet and then transmits routable packets through the 10/100/1000 Mbit Ethernet controller and port 503 to a network 504.

As described elsewhere herein, embodiments of the present invention can automatically determine unspecified serial protocol frames, thereby enabling implementation and operation without foreknowledge of the protocol frames. FIGS. 6-12 are schematic diagrams depicting various ways that embodiments described herein can automatically determine the unspecified serial protocol frames.

Figure 6:
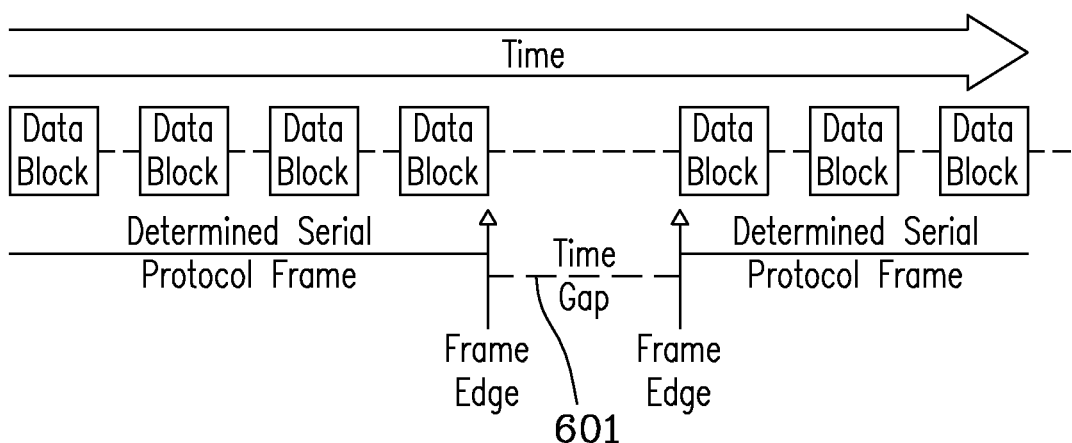
FIGS. 6-11 are diagrams depicting various approaches to determining an unspecified serial protocol frame according to embodiments of the present invention.

Referring to FIG. 6, the serial protocol frame determination can be based on timing-based signals. In such instances, the processing device can execute further programming to associate timing gaps 601 above a selected time threshold between the timing-based signals with frame edges that define the serial protocol frames. In other words, a substantial time gap can delineate one frame edge from another.

Figure 7:
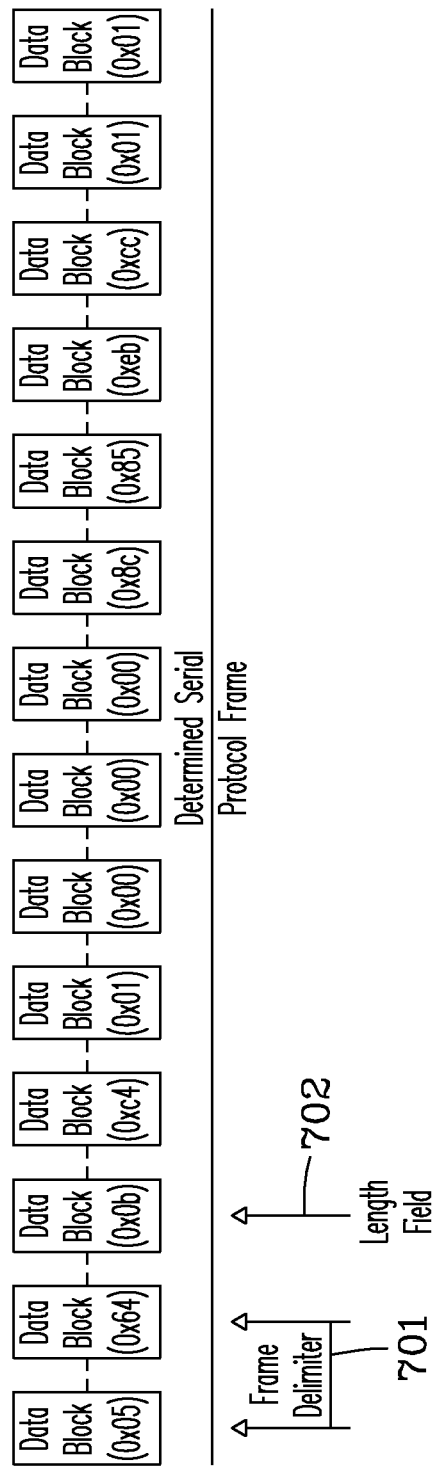

Referring to FIG. 7, determination can be based on frame synchronization delimiters and length fields. The processing device can execute further programming to define the beginning and the length of serial protocol frames according to a frame synchronization delimiter 701 and length field 702, respectively. For example, optional offsets can be utilized. The offsets can be variable in length because some protocols utilize a header and then a length field. The offsets can address such instances and others that are similar.

Figure 8:
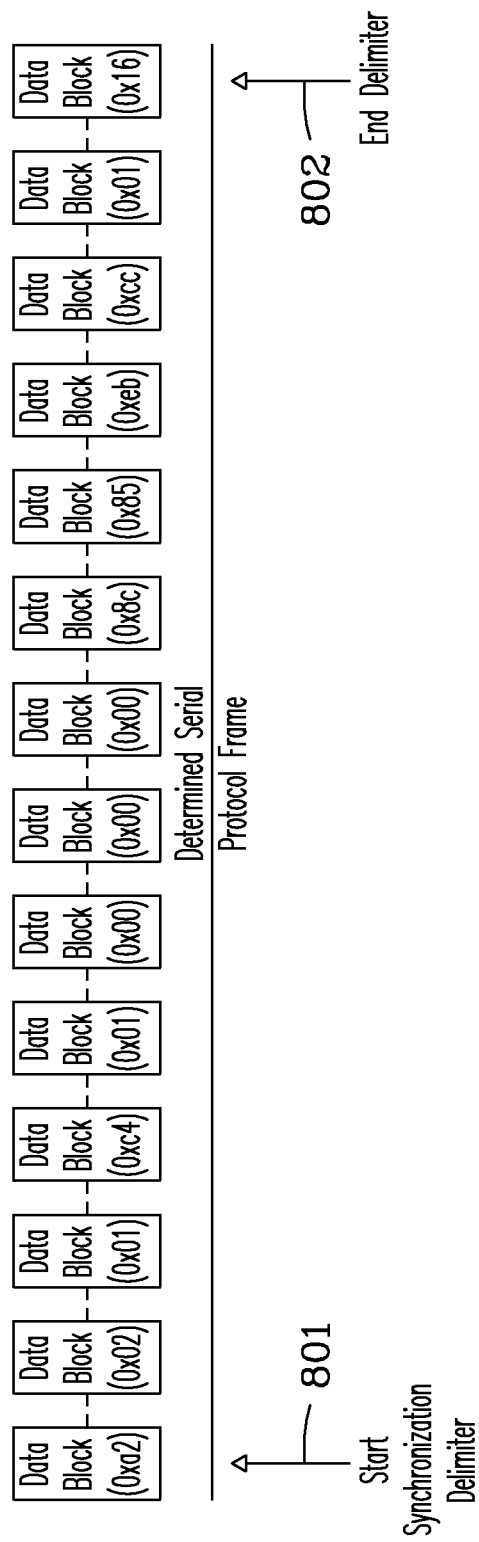

Referring to FIG. 8, determination of serial protocol frames can be based on frame synchronization delimiters 801 and frame end delimiters 802. The processing device executes further programming to define the beginning and the end of serial protocol frames according to the frame synchronization delimiters and frame end delimiters, respectively.

Figure 9:
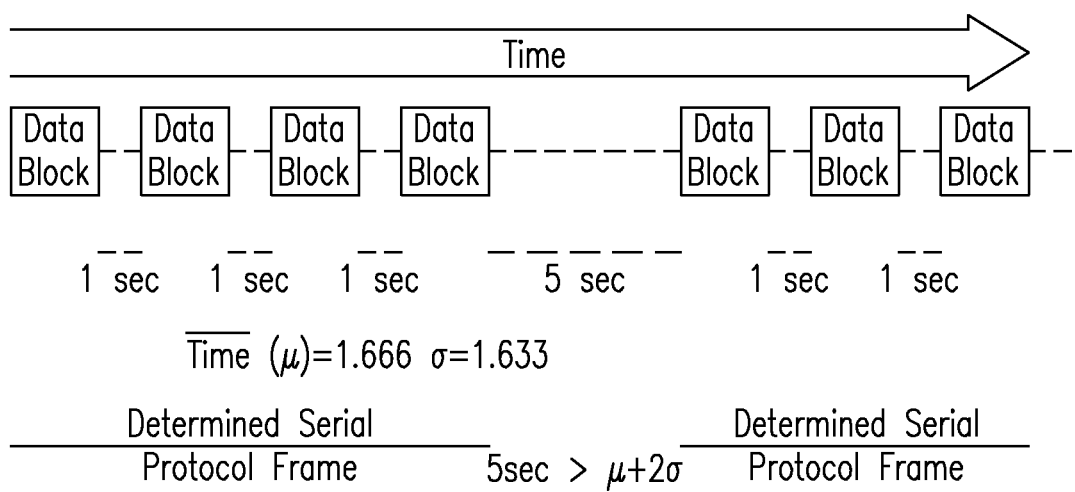

Determination can alternatively include time variance between signals. The processing device can execute further programming to identify a baseline time gap in the signals and to define statistically significant deviations from the baseline time gap as the beginnings and the ends of serial protocol frames. As used herein, a baseline time gap can refers to the mean value of some or all of the previously processed signal time gaps and the associated standard deviation range. Statistically significant deviations from the baseline time gap can be determined by time gaps that fall outside a standard deviation range from the mean. The gap can be used to identify one frame from another. As depicted in FIG. 9, one approach involves the processing device calculating the mean ($\mu$) and standard deviation ($\sigma$) of time gaps between each data block in the communication. A protocol frame edge can determined by any time gap that is greater than two standard deviations from the mean.

Figure 10:
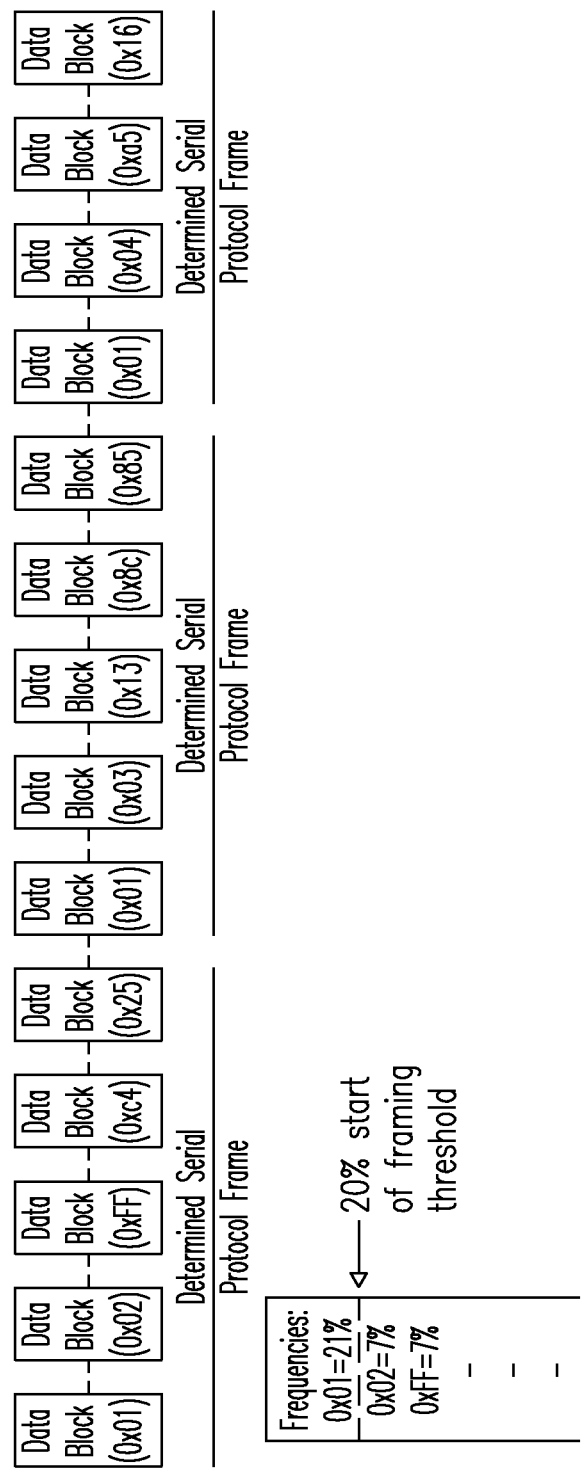

Additional alternatives encompass the use of byte frequency. As used herein, byte frequency can refer to frequencies of occurrence for patterns of 2 or more byte sequences that occur in the serial traffic. Statistically significant byte frequency patterns can refer to byte frequencies that have a higher frequency percentage of occurrences relative to other byte frequencies. They can be determined by continuously calculating the frequencies of occurrence for patterns in the data. Those byte frequencies with the highest frequency of occurrence can be designated as statistically significant according to predetermined criteria, such as threshold for a percentage of occurrence. The processing device executes further programming to identify statistically significant occurrences of byte frequency patterns and to define the statistically significant occurrences with the beginnings and the ends of serial protocol frames. Referring to FIG. 10, the byte frequency for most data blocks is approximately 7%. However the frequency of 0x01 is 21%. Accordingly, it is identified as the beginning and end between serial protocol frames.

Figure 11:
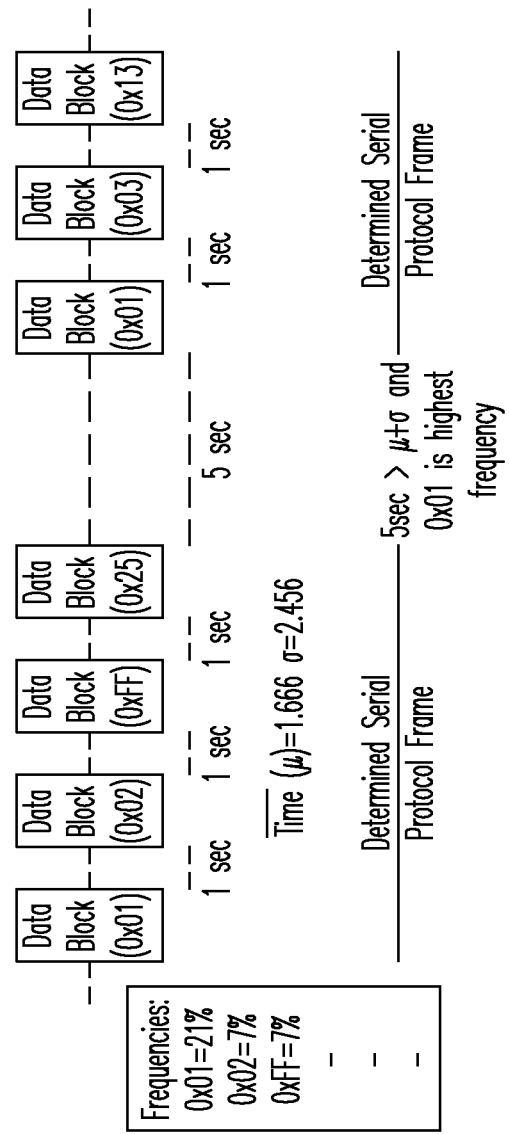
Figure 12:
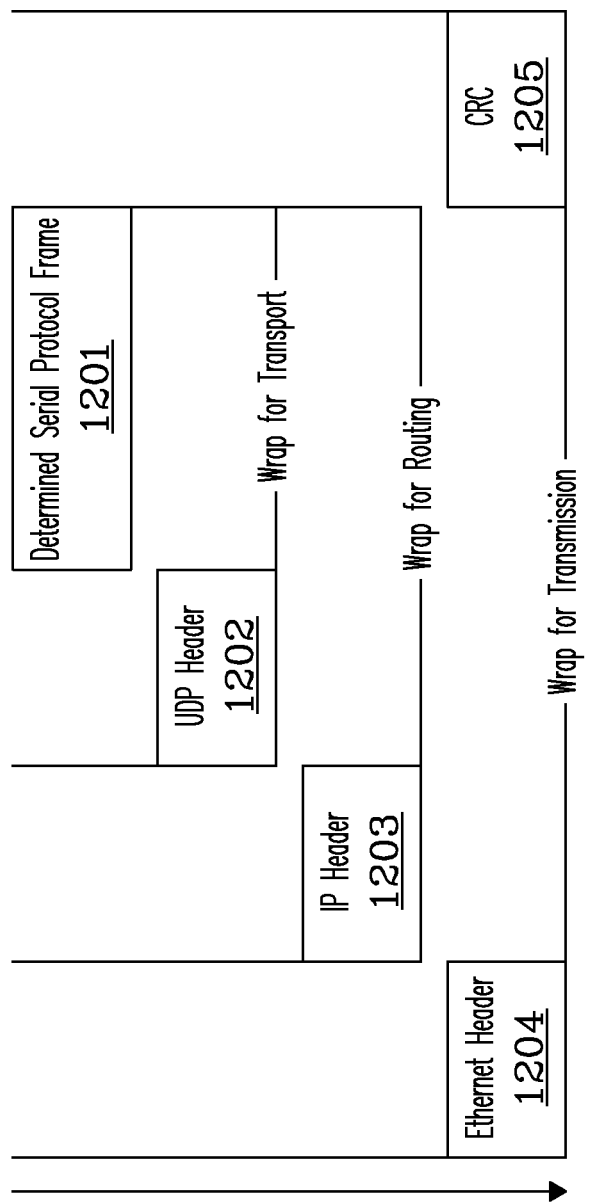
FIG. 12 is a diagram depicting the wrapping of a serial protocol frame to form a routable packet according to one embodiment of the present invention.

Referring to FIG. 11, determination of the protocol frames can include byte frequency as well as time variance between signals. The processing device executes further programming to identify statistically significant occurrences of byte frequency patterns, to identify a baseline time gap in the signals, and to define statistically significant deviations from the baseline time gap combined with statistically significant occurrences of byte patterns as the beginnings and the ends of the serial protocol frames.

Once the serial protocol frames are identified, data can be wrapped in order to form routable packets. Referring to one example depicted in FIG. 12, a universal datagram protocol (UDP) header 1202 is added to a determined serial frame 1201. An IP header 1203 can then be added to the UDP frame. Finally, an Ethernet header 1204 and CRC 1205 is added to wrap the IP frame.

Figure 13:
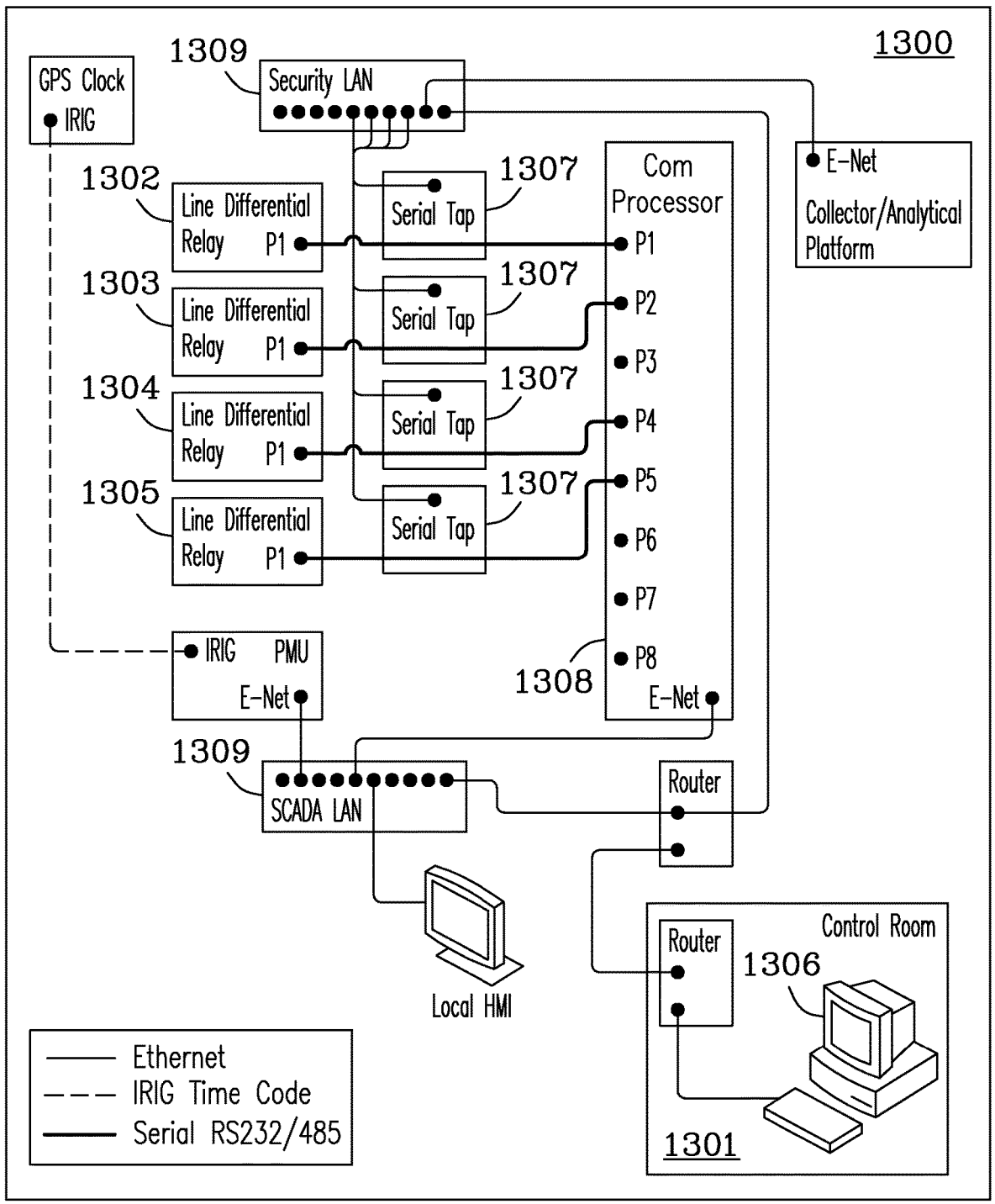
FIG. 13 is a diagram of a system implementing various embodiments of the present invention.

FIG. 13 includes an illustration depicting a legacy process control system 1300 in which various sensor and relays are connected to the system via serial communications. As depicted, a breaker fault protection device 1302, a recloser 1303, a line distance relay 1304, and a line differential relay 1305 communicate data to and from a com processor 1308 via serial cables. The serial cables are tapped by SerialTap devices 1307 according to embodiments of the present invention. The SerialTap devices are interfaced to a security network via Security LAN 1309. Communications intercepted by the SerialTap devices can be monitored in a control room 1301 using a workstation 1306 separate from the process control system and the SCADA LAN 1310 by which the legacy system communicates. Failure of one or more of the SerialTap devices has no impact on the regular operation of the process control system.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An apparatus to passively tap bi-directional serial communications having serial protocol frames that are unspecified to the apparatus, the apparatus characterized by:

Passive, serial-communications, interception circuitry comprising at least two serial communications pass-throughs and a processor, each serial communications pass-through connected to the processor and interfaced to a serial communication cable through which the bi-directional serial communications are transmitted between at least two devices;

The processor executing programming to determine serial protocol frames according to characteristics of the serial communications, to wrap the serial protocol frames in a routable protocol, thereby forming a plurality of routable packets, and to transmit the routable packets to one or more routable addresses through an interface connecting the processor to a routable network.

2. The apparatus of claim 1, further comprising a pair of serial ports directly connected to the serial communication cable and wherein the passive, serial-communications, interception circuitry has an impedance greater than that of the serial communication cable.

3. The apparatus of claim 1, wherein each pass-through comprises an inductive coupling configured to induce a voltage in the interception circuitry in response to a current in the serial communication cable.

4. The apparatus of claim 1, wherein each pass-through comprises a capacitive coupling.

5. The apparatus of claim 1, wherein the characteristics of serial communications comprise timing-based signals, and the processing device executes further programming to associate timing gaps between the timing-based signals with frame edges that define the serial protocol frames.

6. The apparatus of claim 1, wherein the characteristics of serial communications comprise frame synchronization delimiters and length fields and the processing device executes further programming to define the beginning and the length of serial protocol frames according to the frame synchronization delimiters and length fields, respectively.

7. The apparatus of claim 1, wherein the characteristics of serial communications comprise frame synchronization delimiters and frame end delimiters and the processing device executes further programming to define the beginning and the end of serial protocol frames according to the frame synchronization delimiters and frame end delimiters, respectively.

8. The apparatus of claim 1, wherein the characteristics of serial communications comprise time variance between signals and the processing device executes further programming to identify a baseline time gap in the signals and to define statistically significant deviations from the baseline time gap as the beginnings and the ends of serial protocol frames.

9. The apparatus of claim 1, wherein the characteristics of serial communications comprise byte frequency and the processing device executes further programming to identify statistically significant occurrences of byte frequency patterns and to define the statistically significant occurrences with the beginnings and the ends of serial protocol frames.

10. The apparatus of claim 1, wherein the characteristics of serial communications comprise byte frequency as well as time variance between signals and the processing device executes further programming to identify statistically significant occurrences of byte frequency patterns, to identify a baseline time gap in the signals, and to define statistically significant deviations from the baseline time gap combined with statistically significant occurrences of byte patterns as the beginnings and the ends of the serial protocol frames.

11. The apparatus of claim 1, wherein the unspecified serial protocol frames are based on a process control serial protocol.

12. The apparatus of claim 1, further comprising storage circuitry storing the programming, wherein the pass-throughs, the processor, the storage circuitry, and the interface are assembled as an embedded system.

13. The apparatus of claim 1, wherein the at least two serial communications pass-throughs individually comprise an electrical conductor which is in electrical and physical contact with a respective electrical conductor of the serial communication cable.

14. The apparatus of claim 1, wherein one of the at least two serial communications pass-throughs communicates data which is independent of data communicated via another of the at least two serial communications pass-throughs.

15. The apparatus of claim 1, wherein the serial protocol frames individually comprise a plurality of bits, and the processor executes programming to wrap the bits of one of the serial protocol frames within one of the routable packets.

16. The apparatus of claim 1, wherein an entirety of one of the serial protocol frames is wrapped within only one of the routable packets.

17. The apparatus of claim 1, wherein only one of the serial protocol frames is wrapped within only one of the routable packets.

18. The apparatus of claim 1, wherein all of the data blocks of one of the serial protocol frames is wrapped within only one of the routable packets.

19. The apparatus of claim 1, wherein a header and data of one of the serial protocol frames is wrapped within only one of the routable packets.

20. The apparatus of claim 1, wherein the serial protocol frames are communicated by the serial communications according to an unknown protocol.

21. The apparatus of claim 1, wherein all of the bits of one of the serial protocol frames are wrapped in only one of the routable packets.

22. The apparatus of claim 1 wherein the routable network is connected to a security network and the processor executes the programming to transmit the routable packets to the security network via the routable network.

23. The apparatus of claim 22 further comprising a plurality of additional interception circuits connected to the security network via the routable network, and wherein the additional interception circuits individually comprise at least two serial communications pass-throughs and a processor.

24. The apparatus of claim 23 wherein the at least two devices are devices of a process control system and failure of the interception circuitry has no impact on the transmission of the bi-directional serial communications between the at least two devices of the process control system.

25. The apparatus of claim 1 wherein a protocol of the serial protocol frames of the serial communications is not known by the processor during the executing of the programming to determine the serial protocol frames.

26. The apparatus of claim 1 wherein a protocol of the serial protocol frames of the serial communications is unspecified to the apparatus during the executing of the programming by the processor to determine the serial protocol frames.

27. The apparatus of claim 1 wherein each of the pass-throughs is interfaced to a respective one of a plurality of single lines of the serial communication cable and which individually communicates the bi-directional serial communications in one direction between serial ports of the at least two devices.

28. The apparatus of claim 1 wherein the processor executes the programming to determine the serial protocol frames which comprises frames of different serial communications protocols.

29. The apparatus of claim 1, wherein the processor is configured to form a plurality of data blocks and to use the data blocks to determine the serial protocol frames.

30. A method to passively tap bi-directional serial communications, which have serial protocol frames that are unspecified, transmitted through a serial communication cable between at least two devices, the method executed by a processor and characterized by the steps of:
  Passively intercepting the serial communications through at least two serial communications pass-throughs connected to the processor and to the serial communication cable;
  Determining serial protocol frames according to characteristics of the serial communications;
  Forming routable packets by wrapping the serial protocol frames in a routable protocol; and
  Transmitting the routable packets to one or more routable addresses through an interface connecting the processor to a routable network.

31. The method of claim 30, wherein the characteristics of serial communications comprise timing-based signals, and said determining comprises associating timing gaps between the timing-based signals with frame edges that define the serial protocol frames.

32. The method of claim 30, wherein the characteristics of serial communications comprise frame synchronization delimiters and length fields and said determining comprises defining the beginning and the length of serial protocol frames according to the frame synchronization delimiters and length fields, respectively.

33. The method of claim 30, wherein the characteristics of serial communications comprise frame synchronization delimiters and frame end delimiters and said determining comprises defining the beginning and the end of serial protocol frames according to the frame synchronization delimiters and frame end delimiters, respectively.

34. The method of claim 30, wherein the characteristics of serial communications comprise time variance between signals and said determining comprises to identifying a baseline time gap in the signals and defining statistically significant deviations from the baseline time gap as the beginnings and the ends of serial protocol frames.

35. The method of claim 30, wherein the characteristics of serial communications comprise byte frequency and said determining comprises identifying statistically significant occurrences of byte frequency patterns and defining the occurrences of byte frequency patterns with the beginnings and the ends of serial protocol frames.

36. The method of claim 30, wherein the characteristics of serial communications comprise byte frequency as well as time variance between signals and said determining comprises identifying statistically significant occurrences of byte frequency patterns, identifying a baseline time gap in the signals, and defining statistically significant deviations from the baseline time gap combined with statistically significant occurrences of byte patterns as the beginnings and the ends of the serial protocol frames.

37. The method of claim 30, wherein the unspecified serial protocol frames are based on a process control serial protocol.

38. The method of claim 30 wherein the processor comprises a first processor and the serial communications comprises communications with respect to one of the at least two devices which is a first process control device, and further comprising:
  using a second processor, executing the method with respect to serial communications of a second process control device, and wherein the transmittings of the routable packets comprise transmittings of the routable packets using the first and second processors via the routable network to a security network configured to monitor the first and second process control devices.

* * * * *